Figure 1:
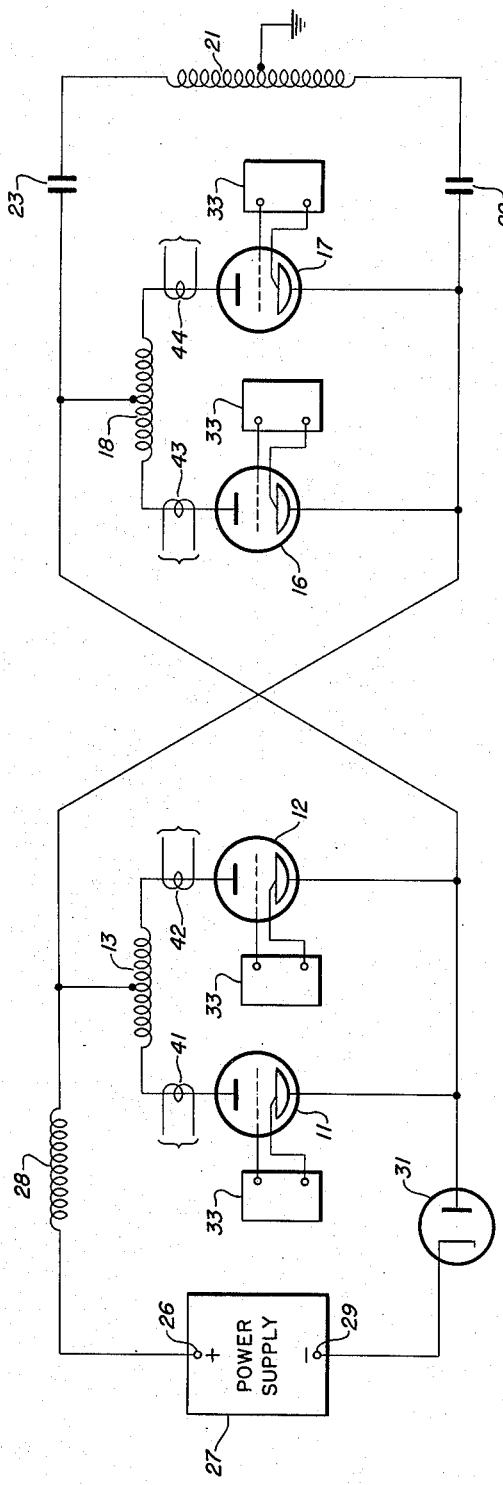

April 24, 1951     G. M. FARLY ET AL     2,550,460
MONITORING CIRCUIT

Filed April 6, 1950     2 Sheets-Sheet 1

INVENTORS.
GEORGE M. FARLY
DICK A. MACK
BY
Roland A. Anderson
ATTORNEY.

INVENTORS.
GEORGE M. FARLY
DICK A. MACK
BY
Roland A. Anderson
ATTORNEY.

Patented Apr. 24, 1951

2,550,460

UNITED STATES PATENT OFFICE 2,550,460

MONITORING CIRCUIT

George M. Farly and Dick A. Mack, Berkeley, Calif., assignors to the United States of America as represented by the United States Atomic Energy Commission Application April 6, 1950, Serial No. 154,322

5 Claims. (Cl. 177—311)

This invention relates to a monitoring circuit and more particularly to an arcback and misfire failure recording device for parallel operated mercury-pool gas tubes.

The application of mercury-pool gas tubes to commercial power circuits, as rectifiers and inverters, has increased considerably in the last few years. In many of these applications such tubes are operated in parallel to drive load circuits which may easily be damaged by continuous overheating or overloading caused by misfire and arcback failures in the tubes. By misfire is meant a failure to operate at a predetermined time and by arcback is meant reverse conduction during the time the tube should normally be non-conducting. Both of these failures may be due to inherent characteristics of the tube and the former may also be caused by a fault in the excitation circuit of the tube.

The present invention has been designed to register the number of each type of failure, which information indicates whether or not operation is normal. It will be readily apparent that a misfire failure of one of two parallel mercury-pool gas tubes results in an unequal distribution of the load in that all of the load current flows through one tube. It will be equally apparent that an arcback failure in one of a parallel set of tubes may result in sufficient residual ionization in the tube prior to the predetermined firing time thereof to cause conduction prior to such predetermined time and a misfire failure in the other tube because of low anode voltage. To provide proper monitoring of the operation of such mercury-pool gas tubes the present invention provides a circuit sensitive to misfire failures and another circuit sensitive to arcback failures for each tube and means for registering the number of each.

It is therefore an object of the present invention to provide a monitoring circuit to indicate failures in parallel operated mercury-pool tubes.

Another object of the present invention is to provide an electronic circuit for registering misfire and arcback failures for each of two parallel operated mercury-pool tubes.

A further object of the present invention is to provide a monitoring circuit for parallel operated mercury-pool gas tubes designed to differentiate between arcback and misfire failures in the tubes and to register the quantities of each of such failures.

A still further object of the present invention is to provide a unitary device of simple construction and utilizing commercial radio parts, well within their ratings, for registering arcback and misfire failures in parallel operated mercury-pool gas tubes.

Figure 2:
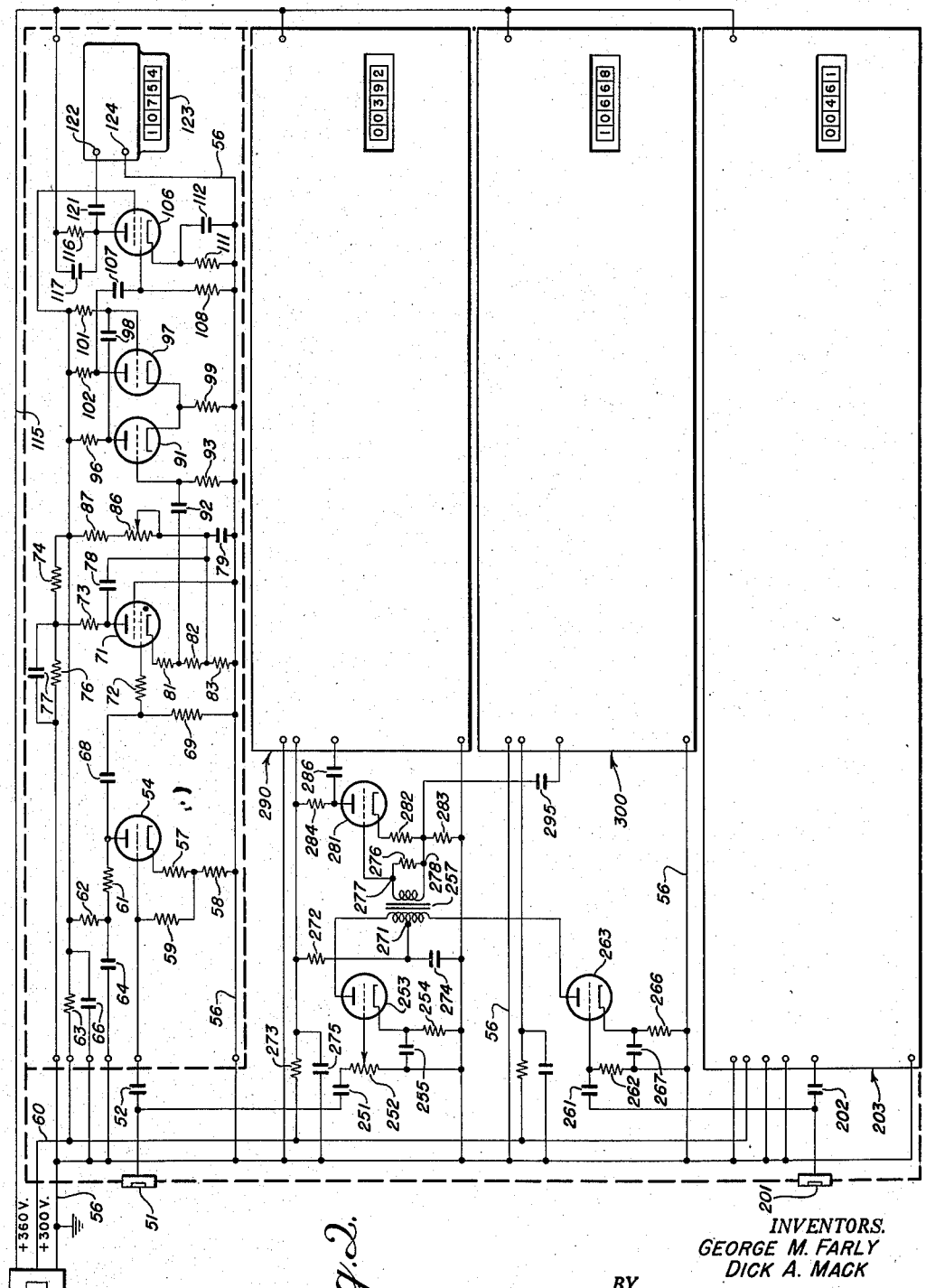

Further objects and advantages will be apparent in the following description and claims considered together with the accompanying drawing, in which:

Figure 1 is a schematic wiring diagram of mercury-pool gas tube inverter circuit; and Fig. 2 is a schematic wiring diagram embodying the present invention.

Referring to the drawing in detail, and Fig. 1 in particular, a pair of mercury-pool gas tubes 11 and 12 are connected in parallel having the cathodes connected together and the anode connected to either side of a load dividing inductor 13. A second pair of mercury-pool gas tubes 16 and 17 are similarly connected in parallel by connecting the cathodes together and by connecting the anodes to opposite ends of a load dividing inductor 18. The pairs of tubes are in inversely parallel relation as the result of connecting the midpoint of the inductor 13 to the cathode of the tubes 16 and 17 and the midpoint of the inductor 18 to the cathode of the tubes 11 and 12. The tubes are further connected to a load, represented in Fig. 1 as a center grounded coil 21, through condensers 22 and 23, one in each side of the line. To provide power to the circuit, the positive terminal 26 of a conventional direct current power supply 27 is connected to the midpoint of the inductor 13 through a current limiting inductor 28 and the negative terminal 29 of the power supply is connected to the cathode of a diode tube 31, the anode of which is connected to the cathode of the tubes 11 and 12. The ignitor and control grid electrodes of each pair of mercury-pool gas tubes are connected to conventional control circuits 33, which alternately render the pairs of tubes conductive at predetermined intervals.

It will be readily apparent from the foregoing description of connections that an inverter circuit has been formed. With the power supply 27 energized, the condensers 22 and 23 become charged. Then, depending upon the control circuits 33 and the values of the circuit elements, a current flows sinusoidally at the resonant frequency in the direction permitted by the pair of mercury-pool gas tubes which is firing at the time.

Since, as pointed out previously, it is desirable to determine the number of misfire and arcback failures of the mercury-pool gas tubes 11, 12, 16, and 17, current monitoring reactors 41, 42, 43, and 44 are, respectively, coupled to the anode circuit of the tubes. The output connections of such current monitoring reactors then carry currents proportional to the current flowing through the tubes.

Considering now, the device illustrated on Fig. 2 of the drawing, an input terminal 51 is connected to one side of a coupling condenser 52, the other side of which is connected to the control grid of a triode inverter-amplifier tube 54. The cathode of the tube 54 is connected to a ground connection 56 through two series connected resistors 57 and 58, the junction between which is connected to the control grid through a resistor 59. The anode of the tube 54 is connected to a +300 volt source 60 through three series connected resistors 61, 62, and 63. To bypass radiofrequency currents, a condenser 64 is connected from the junction of the resistors 61 and 62 to the ground connection 56 and a condenser 66 is connected from the junction of the resistors 62 and 63 to the ground connection 56. The anode of the tube 54 is further connected to one side of a coupling condenser 68. The other side of the condenser 68 is connected to the ground connection 56 through a resistor 69 and to the control grid of a tetrode gaseous discharge tube 71 through a current limiting resistor 72.

To furnish an operating voltage for the tube 71 the anode is connected to the junction between the resistors 62 and 63 through two series connected resistors 73 and 74. As part of a voltage dividing network, the common connection between the resistors 73 and 74 is connected to the ground connection 56 through a parallel connected resistor 76 and condenser 77. Any radiofrequency voltages appearing at the anode of the tube 71 are by-passed to the ground connection 56 by two series connected condensers 78 and 79 connected therebetween. The cathode of the tube 71 is connected to the ground connection 56 through three series connected resistors 81, 82, and 83. The junction between the two resistors 82 and 83 is connected to the junction between two condensers 78 and 79 to by-pass radiofrequency components of voltage across the resistor 83 and to the common point between the two resistors 62 and 63 through a series connected potentiometer 86 and resistor 87. The latter connection is made to provide means for varying the cathode voltage of the tube 71 and thereby the conduction voltage of the tube.

As a further connection the junction between the resistors 81 and 82 in the cathode circuit of the tube 71 is coupled to the control grid of a triode tube 91 by a coupling condenser 92. The control grid of the tube 91 is connected to the ground connection 56 through a grid bias resistor 93. The anode of the tube 91 is connected to the common connection between the resistors 62 and 63 through a dropping resistor 96 and to the control grid of a triode tube 97 through a coupling condenser 98. The cathode of the tube 91 is connected to the cathode of the tube 97 which is further connected to the ground connection 56 through a resistor 99. To maintain the tube 97 in a normally conducting state, the control grid and anode are connected to the junction between the resistors 62 and 63 through resistors 101 and 102, respectively.

The anode of the tube 97 is coupled to the control grid of a power amplifier tube 106 through a coupling condenser 107. A grid bias resistor 108 is connected from the control grid of the tube 106 to the ground connection 56. The cathode of the tube 106 is connected to the ground connection 56 through a parallel connected resistor 111 and condenser 112. The screen grid of the tube 106 is connected to the junction between resistors 62 and 63 and the anode is connected to a +360 volt source 115 through a parallel connected resistor 116 and condenser 117, which connections complete the operating conditions for the tube.

A condenser 121 serves to couple the anode of the tube 106 to a terminal 122 of a conventional electromechanical register 123, the other terminal 124 of which is connected to the ground connection 56.

The connections thus far described comprise a circuit which is sensitive to register negative pulses of voltage occurring between the input terminal 51 and the ground connection 56. It will thus be apparent that by connecting the leads of the current monitoring reactor 41 appropriately to the terminal 51 and ground connection 56, a negative pulse of voltage will occur each time there is an arcback failure in the mercury-pool gas tube 11. The impression of the negative pulse on the control grid of the tube 54, which is normally conducting, results in a decrease in the conduction of the tube and a corresponding increase in the anode voltage. This voltage increase at the anode of the tube 54 is coupled to the control grid of the gas tube 71, thereby triggering the tube. The sensitivity of the channel is adjustable by means of the potentiometer 86 which establishes the cathode to anode potential for the tube 71 and controls the value of control grid voltage necessary to trigger the tube. Upon the triggering of the tube 71, the cathode voltage increases sharply and the condenser 78 in the anode circuit of the tube becomes charged negatively so that the tube is abruptly made nonconductive. The rise in voltage at the cathode of the tube 71 during the time of conduction therethrough is in the form of sharp positive pulse of voltage and is coupled to the control grid of the tube 91 through the condenser 92. The tubes 91 and 97 are connected in the form of a one-shot multivibrator with the tube 97 normally conducting because of the positive grid bias and the tube 91 cut off by virtue of the positive cathode voltage impressed by current flow from tube 97 through the resistor 99. With such normal operating conditions existing a positive pulse of voltage applied at the control grid of the tube 91 causes current to flow through the tube. As current flows through tube 91 the anode voltage drops and this voltage decrease is impressed on the control grid of the tube 97 thereby rendering the tube 97 nonconductive. Tube 91 conducts only for the duration of the positive pulse applied at the control grid and tube 97 remains nonconducting until the charge on the condenser 98 leaks off at which time the combination of tubes 91 and 97 resumes the normal state. It will be readily apparent that a positive square wave of voltage is formed at the anode of the tube 97 and having a duration equal to the discharge time of the condenser 98 in response to each input pulse of voltage. Since the anode of the tube 97 is coupled to the control grid of the tube 106, the square wave of voltage is impressed thereon. The tube 106 is connected as a power amplifier and the output therefrom, as taken between the anode and ground connection 56, is impressed upon the terminals 122 and 124, respectively, of the electromechanical register 123.

Thus, there has been provided an electronic channel which is sensitive only to arcback failures in the mercury-pool gas tube 11 and will register the number of such failures.

The leads of the current monitoring reactor 42 in the anode circuit of the mercury-pool gas tube 12 are appropriately connected between a terminal 201 and the ground connection 56 so that negative pulses of voltgae due to arcback failure of the tube 12 are impressed thereon. The terminal 201 is connected to a condenser 202 which in turn is connected to an electronic channel 203 which is similar in all respects to the foregoing described channel. Therefore, arcback failures in the mercury-pool gas tube 12 are registered as they occur.

To provide means for registering misfire failures of the mercury-pool gas tubes 11 and 12, two more electronic channels are utilized as follows. The terminal 51 is connected to one side of a condenser 251, the other side of which is connected to the ground connection 56 through a potentiometer 252. The movable element of the potentiometer 252 is connected to the control grid of a triode tube 253. The cathode of the tube 253 is connected to the ground connection 56 through a parallel resistor 254 and condenser 255 while the anode is connected to one end of the primary winding of a transformer 257.

The terminal 201 is connected to one side of a condenser 261, the other side of which is connected to the ground connection 56 through a resistor 262 and to the control grid of a tube 263. The cathode of the tube 263 is connected to the ground connection 56 through a parallel resistor 266 and condenser 267 and the anode is connected to the other end of the primary winding of the transformer 257. A center tap 271 on the primary winding of the transformer 257 is connected to the +300 volt source 60 through series connected resistors 272 and 273 and to the ground connection 56 through a by-pass condenser 274. The junction between the resistors 272 and 273 is also by-passed to the ground connection 56 through a condenser 275.

A resistor 276 is connected in shunt with the secondary winding of the transformer 257. One side 277 of the resistor 276 is connected to the control grid of a tube 281 and the other side 278 of the resistor is connected to the cathode through a resistor 282 and to the ground connection 56 through a resistor 283. The anode of the tube 281 is connected to the junction of the resistors 272 and 273 through a dropping resistor 284. The anode of the tube 281 is further connected to a coupling condenser 286 which is similar in function to the condenser 68 and couples the anode to a pulse forming, amplifying, and registering circuit 290 comprising a series of tubes connected in the same manner as the tubes 71, 91, 97, and 106 as described for the arcback channel in the foregoing discussion. The junction between the resistors 282 and 283 is connected to a coupling condenser 295 which is connected to a pulse forming, amplifying, and registering circuit 300 similar to the previously described circuit 290.

During normal operation of the mercury-pool gas tubes 11 and 12, a positive pulse of voltage is transmitted each time the tubes conduct to the terminals 51 and 201. Such positive pulses of voltage do not affect the operation of the tube 54 nor of the channel 203; however, the control grid of the tubes 253 and 263 are biased so that current flows therethrough. Since both tubes 253 and 263 conduct simultaneously, opposing currents flow through the primary winding of the transformer 257 thereby nullifying the effect upon the secondary winding so that no voltage is developed thereacross. To ensure that the tubes 253 and 263 conduct equally, the potentiometer 252 is provided for adjustment purposes in the control grid circuit of the tube 253.

Should a misfire occur in the mercury-pool gas tube 11, there will be no positive pulse of voltage applied to the control grid of the tube 253; however, the tube 263 will be properly biased to the conduction stage and a current will flow through the corresponding portion of the primary winding of the tranesformer 257. Such current flow establishes a voltage across the secondary winding which places a negative voltage on the control grid of the tube 281. Since the connections of the tube 281 maintain the tube in a normally conducting state, the negative voltage at the control grid causes the conduction to stop and the anode voltage to rise toward the source voltage applied. The anode voltage of the tube 281 is coupled by the condenser 286 to the pulse forming, amplifying, and registering circuit 290 to count the number of misfire failures of the mercury-pool gas tube 11.

It will be clearly apparent from the foregoing that a misfire of the mercury-pool gas tube 12 will develop a voltage of opposite polarity across the secondary winding of the transformer 257 which is coupled positively to the control grid of the tube 281 and positively to the input of the pulse forming, amplifying, and registering circuit 300. Since the tube 281 is normally conducting there is normally a positive voltage across the resistor 283 in the cathode circuit. It is therefore necessary to make the circuit 300 sensitive to only the increase in conduction of the tube 281 caused by the positive bias applied to the control grid from the secondary winding of the transformer 257. As has been described hereinbefore, the required sensitivity may be obtained by adjusting a pitentiometer in the pulse forming network similar to the potentiometer 86 in the circuit of the tube 71.

With the failure indicating circuit just described it is possible to register both the arcback and misfire failures of each of the two parallel operated mercury-pool gas tubes 11 and 12. A similar circuit appropriately connected to the current monitoring reactors 43 and 44 in the anode circuits of the other two parallel operated mercury-pool gas tubes 16 and 17 will serve a similar purpose for them.

While the salient features of the present invention have been described with respect to a particular embodiment it will, of course, be apparent that numerous modifications may be made within the spirit and scope of this invention and it is therefore not desired to limit the invention to the exact details shown except insofar as they may be defined in the following claims.

What is claimed is:

1. In a monitoring device for two parallel operated mercury-pool gas tubes having a current monitoring reactor connected to the anode of each, registering means connected to one of said reactors responsive to negative pulses therethrough, registering means connected to the other of said reactors responsive to negative pulses therethrough, balancing means connected to both of said reactors and having a zero output when a pulse of similar polarity occurs at both of said reactors, registering means connected to said balancing means responsive to an unbalance resulting from a misfire failure in one of said tubes, and registering means connected to said balancing means responsive to an unbalance resulting from a misfire failure in the other of said tubes.

2. In a monitoring device for two parallel operated mercury-pool gas tubes having a current monitoring reactor connected to the anode of each, the combination comprising means connected to one of said reactors for registering a count each time reverse current flows through the respective tube, means connected to the other of said reactors for registering a count each time reverse current flows through the respective tube, discriminating means connected to both of said reactors for passing pulses each time said tubes conduct in a forward direction, balancing means connected to said discriminating means and having a zero output when both of said tubes conduct, registering means connected to said balancing means responsive to unbalance thereof caused by nonconductance of one of said tubes, and registering means connected to said balancing means responsive to unbalance thereof caused by nonconductance of the other of said tubes.

3. In a monitoring device for two parallel operated mercury-pool gas tubes having a current monitoring reactor connected to the anode of each, the combination comprising means connected to one of said reactors for registering a count each time reverse current flows through the respective gas tube, means connected to the other of said reactors for registering a count each time reverse current flows through the respective gas tube, a first triode tube and a second triode tube each having an anode, control grid and cathode, means connected between one of said reactors and the control grid of said first triode tube for coupling pulses thereto, means connected between the other of said reactors and the control grid of said second triode for coupling pulses thereto, a transformer having a center tapped primary winding connected with the primary winding in series between the anodes of said first and second triode tubes, said center tap being connected to a source of positive voltage, separate bias means connected to each of said first and second triode tubes for rendering them normally nonconductive, registering means connected to the secondary winding of said transformer responsive to a pulse formed by nonconductance of one of said gas tubes, and registering means connected to the secondary winding of said transformer responsive to a pulse formed by nonconductance of the other of said gas tubes.

4. In a monitoring device for two parallel operated mercury-pool gas tubes having a current monitoring reactor connected to the anode of each, the combination comprising means connected to one of said reactors for registering a count each time reverse current flows through the respective gas tube, means connected to the other of said reactors for registering a count each time reverse current flows through the respective gas tube, first discriminating means connected to one of said reactors for passing a pulse each time the respective gas tube conducts positively, second discriminating means connected to the other of said reactors for passing a pulse each time the respective gas tube conducts positively, balancing means connected to said first and second discriminating means for determining a zero output when both of said gas tubes conduct, registering means connected to said balancing means responsive to nonconductance of one of said gas tubes, and registering means connected to said balancing means responsive to nonconductance of the other of said gas tubes.

5. In a monitoring device for two parallel operated mercury-pool gas tubes having a current monitoring reactor connected to the anode of each, the combination comprising means connected to one of said reactors for registering a count each time reverse current flows through the respective gas tube, means connected to the other of said reactors for registering a count each time reverse current flows through the respective gas tube, first discriminating means connected to one of said reactors for passing a pulse each time the respective gas tube conducts positively, second discriminating means connected to the other of said reactors for passing a pulse each time the respective gas tube conducts positively, a transformer having a primary and a secondary winding, said primary winding being connected between said first and second discriminating means whereby simultaneous pulses passed by said discriminating means are opposing and zero voltage is maintained across said secondary winding, registering means connected to said secondary winding responsive to voltage thereacross during nonconductance of one of said gas tubes, and registering means connected to said secondary winding responsive to voltage thereacross during nonconductance of the other of said gas tubes.

GEORGE M. FARLY.
DICK A. MACK.

REFERENCES CITED

The following references are of record in the file of this patent:

UNITED STATES PATENTS

| Number | Name | Date |
| --- | --- | --- |
| 2,057,531 | Livingston | Oct. 13, 1936 |
| 2,158,934 | Griffith | May 16, 1939 |
| 2,405,121 | Fehr | Aug. 6, 1946 |
| 2,405,397 | Bedford | Aug. 6, 1946 |